United States Patent
Jackson (10) Patent No.: US 9,239,736 B2
(45) Date of Patent: *Jan. 19, 2016

(54) SYSTEM AND METHOD OF PROVIDING A FIXED TIME OFFSET BASED DEDICATED CO-ALLOCATION OF A COMMON RESOURCE SET

(71) Applicant: Adaptive Computing Enterprises, Inc., Provo, UT (US)

(72) Inventor: David Brian Jackson, Spanish Fork, UT (US)

(73) Assignee: Adaptive Computing Enterprises, Inc., Provo, UT (US)

(*) Notice: Subject to any disclaimer, the term of this patent is extended or adjusted under 35 U.S.C. 154(b) by 105 days.

This patent is subject to a terminal disclaimer.

(21) Appl. No.: 14/228,454

(22) Filed: Mar. 28, 2014

(65) Prior Publication Data

US 2014/0215485 A1 Jul. 31, 2014

Related U.S. Application Data (63) Continuation of application No. 13/724,087, filed on Dec. 21, 2012, now Pat. No. 8,739,173, which is a continuation of application No. 12/987,631, filed on Jan. 10, 2011, now Pat. No. 8,341,634, which is a continuation of application No. 11/276,013, filed on Feb. 9, 2006, now Pat. No. 7,870,552.

(60) Provisional application No. 60/651,269, filed on Feb. 9, 2005.

(51) Int. Cl.
G06F 9/46 (2006.01)
G06F 15/173 (2006.01)
G06F 9/50 (2006.01)
G06F 9/48 (2006.01)

(52) U.S. Cl.
CPC .. *G06F 9/50* (2013.01); *G06F 9/46* (2013.01); *G06F 9/4881* (2013.01); *G06F 9/5027* (2013.01); *G06F 9/5038* (2013.01); *G06F 2209/484* (2013.01); *G06F 2209/506* (2013.01); *G06F 2209/5014* (2013.01)

(58) Field of Classification Search
None
See application file for complete search history.

(56) References Cited

U.S. PATENT DOCUMENTS 6,041,354 A 3/2000 Biliris et al.
7,376,693 B2 5/2008 Neiman et al.
(Continued)

FOREIGN PATENT DOCUMENTS

WO WO 98/58518 12/1998

*Primary Examiner* — Adam Lee (57) ABSTRACT

Disclosed are a system, method and computer-readable medium relating to managing resources within a compute environment having a group of nodes or computing devices. The method comprises, for each node in the compute environment: traversing a list jobs having a fixed time relationship, wherein for each job in the list, the following steps occur: obtaining a range list of available timeframes for each job, converting each availability timeframe to a start range, shifting the resulting start range in time by a job offset, for a first job, copying the resulting start range into a node range, and for all subsequent jobs, logically AND'ing the start range with the node range. Next, the method comprises logically OR'ing the node range with a global range, generating a list of acceptable resources on which to start and the timeframe at which to start and creating reservations according to the list of acceptable resources for the resources in the group of computing devices and associated job offsets.

20 Claims, 4 Drawing Sheets

(56) References Cited

U.S. PATENT DOCUMENTS

| | | |
|---|---|---|
| 7,430,741 B2 | 9/2008 | Ayachitula et al. |
| 7,490,325 B2 | 2/2009 | Jackson |
| 7,930,398 B2 | 4/2011 | Kawato |
| 8,763,000 B2 * | 6/2014 | Jackson ................ 718/104 |
| 2002/0120741 A1 | 8/2002 | Webb et al. |
| 2002/0194248 A1 | 12/2002 | Wood et al. |
| 2003/0061260 A1 | 3/2003 | Rajkumar |
| 2003/0061261 A1 | 3/2003 | Greene |
| 2003/0084151 A1 | 5/2003 | Simpson et al. |
| 2004/0015973 A1 | 1/2004 | Skovira |
| 2004/0034857 A1 | 2/2004 | Mangino et al. |
| 2005/0278760 A1 | 12/2005 | Dewar et al. |

\* cited by examiner

SYSTEM AND METHOD OF PROVIDING A FIXED TIME OFFSET BASED DEDICATED CO-ALLOCATION OF A COMMON RESOURCE SET

PRIORITY DATA

The present application is a continuation of U.S. patent application Ser. No. 13/724,087, filed Dec. 21, 2012, which is a continuation of U.S. patent application Ser. No. 12/987,631, filed Jan. 10, 2011, now U.S. Pat. No. 8,341,634, issued Dec. 25, 2012, which is a continuation of U.S. patent application Ser. No. 11/276,013, filed Feb. 9, 2006, now U.S. Pat. No. 7,870,552, issued Jan. 11, 2011, which claims priority to U.S. Provisional Application No. 60/651,269, filed Feb. 9, 2005, the contents of which are incorporated herein by reference in their entirety.

BACKGROUND

1. Field

The present disclosure relates to a resource management system and more specifically to a system and method of providing a fixed time offset-based dedicated co-allocation of a common resource set in the context of managing resources within a compute environment such as a grid or a cluster.

2. Introduction

Managers of clusters desire maximum return on investment often meaning high system utilization and the ability to deliver various qualities of service to various users and groups. A cluster is typically defined as a parallel computer that is constructed of commodity components and runs as its system software commodity software. A cluster contains nodes each containing one or more processors, memory that is shared by all of the processors in the respective node and additional peripheral devices such as storage disks that are connected by a network that allows data to move between nodes. A cluster is one example of a compute environment. Other examples include a grid, which is loosely defined as a group of clusters, and a computer farm which is another organization of computer for processing.

General background information on clusters and grids can be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

Often a job will include several requirements and can be dependent upon another job. An illustrative job can be that every night a television station needs to perform a weather study for its weather reports. The station can contract with an owner or operator of a cluster or a grid for computing time from 2:00 AM to 4:00 AM to utilize compute environment resources to run the analysis. The analysis can involve reserving the resources and include several jobs that require different kinds of resources within the compute environment. For example, a first job can require several hours of processing time, but also be dependent upon a second job to perform data staging or preparation of data prior to the beginning of the first job. Where these two jobs are inter-related and require the consumption of several different types of resources within a cluster or a grid, there is needed in the art for way to maximize the use of resources while being able to process jobs requiring disparate but interrelated resources.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosure herein relates to systems, methods and tangible non-transitory computer-readable media for optimizing the resources used in a compute environment such as a cluster or a grid. The disclosure enables an evaluation of all resources in an instance within a single node and then viewing the resources at a cluster level or as an aggregate of resources level (several clusters). The method involves considering a single node and stepping through all jobs or all requirements and/or resource requests on that given node and determining the resource availability for each resource requestor within that node. Then the system arrives at a composite availability for that node before it analyses a subsequence node.

The method embodiment of the disclosure relates to at a method of managing resources within a computing environment having a group of computing devices. The method consists of, for each node in the compute environment: (1) traversing a list jobs having a fixed time relationship, wherein for each job in the list, the following steps occur: a. obtaining a range list of available timeframes for each job; b. converting each availability timeframe to a start range; c. shifting the resulting start range in time by a job offset; d. for a first job, copying the resulting start range into a node range; and e. for all subsequent jobs, logically AND'ing the start range with the node range. Next, the method includes logically OR'ing the node range with a global range, generating a list of acceptable resources on which to start and the timeframe at which to start and creating reservations according to the list of acceptable resources for the resources in the group of computing devices and associated job offsets. The reservation will typically entail the co-allocation of resources according to the analysis done as disclosed herein.

In addition to the method embodiment, the disclosure includes embodiments such as a system (whether it is a single computing device or a group of compute devices in a compute environment) and a computer-readable medium storing instructions for controlling a computing and/or a compute environment as set forth in the method.

As can be seen from the above, the disclosure involves, for interrelated jobs that consume disparate resources, performing an analysis of the compute environment in order to maximize the establishment of reservation of compute resources to process the jobs.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended documents and drawings. Understanding that these drawings depict only typical embodiments of the disclosure and are not therefore to be considered to be limiting of its scope, the principles herein are described and explained with additional specificity and detail through the use of the accompanying drawings.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. The present disclosure relates to resource reservations in the context of a cluster environment. The cluster can be operated by a hosting facility, hosting center, a virtual hosting center, data center, grid, cluster and/or utility-based computing environments.

Every reservation consists of three major components: a set of resources, a timeframe, and an access control list (ACL). Additionally, a reservation can also have a number of optional attributes controlling its behavior and interaction with other aspects of scheduling. A reservation's ACL specifies which jobs can use the reservation. Only jobs which meet one or more of a reservation's access criteria are allowed to use the reserved resources during the reservation timeframe. The reservation access criteria includes, in one example, at least following: users, groups, accounts, classes, quality of service (QOS) and job duration. A job can be any venue or end of consumption of resource for any broad purpose, whether it be for a batch system, direct volume access or other service provisioning.

A workload manager, or scheduler, will govern access to the compute environment by receiving requests for reservations of resources and creating reservations for processing jobs. A workload manager functions by manipulating five primary, elementary objects. These are jobs, nodes, reservations, QOS structures, and policies. In addition to these, multiple minor elementary objects and composite objects are also utilized. These objects are also defined in a scheduling dictionary. A "job" as used herein is a general term in the sense that a job can include a number of subjobs which also can be referred to simply as jobs. Using the above example of a weather analysis job that runs on a cluster environment, consider that the weather analysis is a "job" but requires and will consume several different types of resources within the environment, such as data staging (disk space), processor time, bandwidth requirements and so forth. Each request for individual resources can be considered or termed a "job." The present disclosure specifically relates to the scenario where there are at least two jobs that have an interrelationship in some fashion. For example, the data staging job needs to begin processing a certain amount of time prior to the start of the job that consumes processing time.

A workload manager can operate on a single computing device or multiple computing devices to manage the workload of a compute environment. The "system" embodiment of the disclosure can include a computing device that includes the necessary hardware and software components to enable a workload manager or a software module performing the steps of the disclosure. Such a computing device can include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the disclosure has any specific hardware components and any known or future developed hardware configurations are contemplated as within the scope of the disclosure when the computing device operates as is claimed.

Figure 1A:
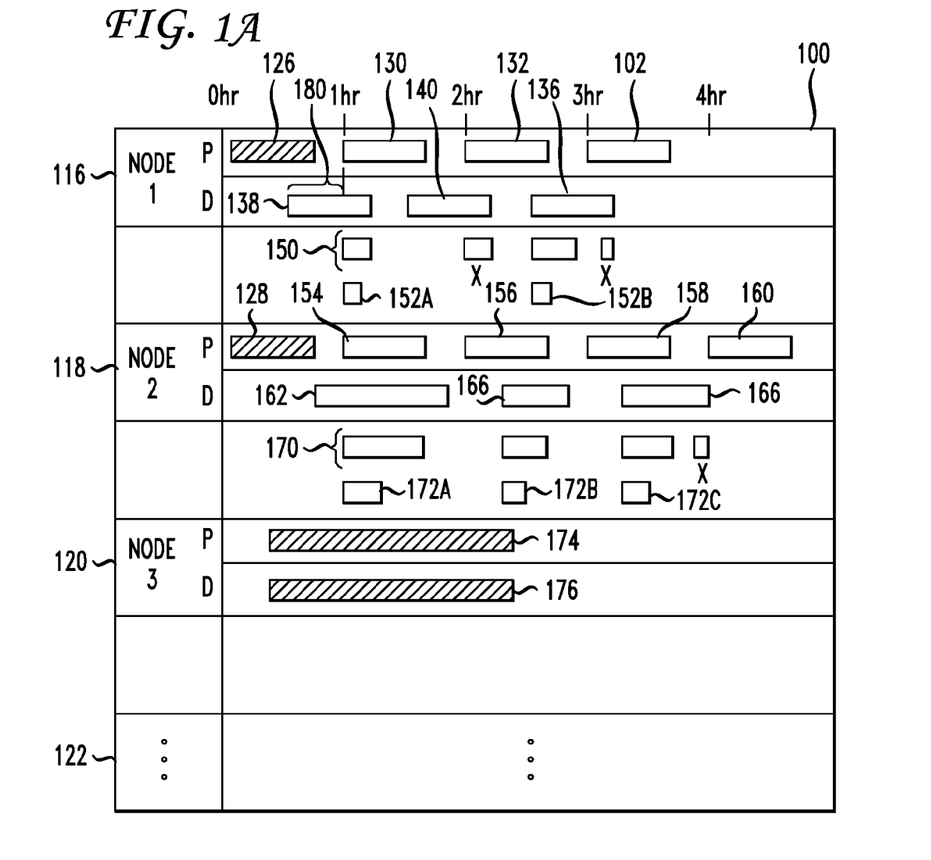
FIG. 1A illustrates the basic concept of the present disclosure.

We now turn to the details of the disclosure which relate to managing a compute environment in the context of maximizing usage of resources where two or more jobs require disparate but interrelated resources. FIG. 1A illustrates for 4 nodes within a cluster or a grid wherein a fixed time relationship between the jobs is created which allows specification and enforcement of a fixed time offset relationship 180 between each of the jobs resulting in at least one of a job overlap, juxtaposition or an offset-based relationship. An aspect of the disclosure involves establishing a forced relationship in space so that all jobs allocate the same resource objects while dedicating subsets of the resource's consumable resources to themselves. The resources mentioned herein relate to the various resources used within a cluster of computer nodes. For example, processing power, data storage, bandwidth in a network, licensing of software, RAM, and so forth. The example will relate to two resources of processor power and data storage but the disclosure can relate to any two different types of resource within the compute environment. Furthermore, the disclosure relates to at least two jobs but can involve two or more jobs requiring two or more disparate resources.

FIG. 1A shows a portion of a computing environment such as a cluster or a grid. The compute environment can have tens, hundreds, thousands (or more) processors or nodes within the environment. Illustrated therefore is a representative computing environment in which the concept of the disclosure can be applied. FIG. 1A shows four nodes 116, 118, 120, 122 each having two types of resources: computer processor resources (P) and disk storage/data staging resources (D). There can be any number of nodes in which the disclosure can be operable and the two types of resources are only illustrative. For example, other types of resources could also be shown in a similar fashion. Assume that a job 1 requires a certain number of hours of computer processing time. Also assume that there is an associated job 2 that requires some amount of disk space time. The relationship between these is flexible. In other words, there can be a master job that has two or more sub-jobs (jobs 1 and 2) or resource requests for processor time, disk space, etc. It is not a requirement in consuming resources on the compute environment that there be more than one job or resource request. However, it is the context of the present disclosure where disparate types of resources are interrelated. Jobs or resource requests that have a highest priority can be provided first access to all available resources.

FIG. 1A shows several features on node1 116. This figure shows an analysis and some of the steps of the disclosure. Feature 126 can represent used or unavailable resources at a particular time. The horizontal axis in FIGS. 1A and 1B relates to time with, typically, the "0 hr" time as current time. Features 130, 132 and 102 represent available timeframes for job 1 to utilize the processor of node 1. Features 138, 140 and 136 represent available timeframes for utilizing disk space associated with job 2. These bars shown as associated with node 1 116 are not reservations but represent available time frames on which a reservation could be made. Thus, for job 1, available timeframes are shown at which the job could start include at 1 hr from the current time, two hours from the current time and three hours from the current time. Similarly, time frames in which the job 2 could start are shown in features 138, 140 and 136.

The graph of FIG. 1A is used to illustrate the resources (on the vertical axis) versus time (on the horizontal axis) for several nodes in the compute environment. It illustrates how the available timeframes for the jobs that utilize disparate types of resources will be processed to analyze the compute environment and maximize the resulting reservation of the compute environment to consume resources when the jobs process. Utilizing these features of the disclosure helps to increase the efficiency of the compute environment.

Feature 150 represents a logical AND'ing of the available timeframes for processors and disk space and thus represents a listing of available timeframes for that node. Feature 152 represents a conversion of each availability timeframe into a start range. The system performs some analysis on the listing of available time ranges to determine given parameters such as when each job can start, and how long each job is, and other parameters, the actual available start ranges 152A, 152B for jobs can be different from the available timeframes 150. For example, to generate the start range, the system utilizes a wall time which is applied to the availability timeframes to generate the start range. The wall time relates to the amount of time that a particular resource will be required to process a job. Thus, if an availability time (130 FIG. 1B) runs an hour, but the wall time for that resource will be required is ½ hour, then the start time associated with that particular availability timeframe must be for ½ hour as is represented by 130A. Note the x's below several of the timeframes in 150 which illustrate that these are disqualified as time ranges for jobs to actually consume resources within the compute environment.

Node 2 118 is shown with unavailable resources 128 and available timeframes 154, 156, 158, 160 for a resource type of a processor for a job, and available timeframes for disk space at 162, 164 and 166 for another job. These timeframes can be for job 1 and job 2 respectively if these jobs will be utilizing more than one node. Feature 170 represents the available timeframes for node 2 118 which is an AND'ing of the available timeframes associated with the different resource types. Feature 172A, 172B and 172C represent the start range for node 2 which is the result of an analysis of when jobs can actually start and complete given all other relative parameters. Node 3 120 is shown with blocks 174 and 176 showing unavailable resources. As can be appreciated, other resource types can be added to this concept, such as bandwidth, RAM, and so forth. The use of the processors and disk space is illustrative only.

Having introduced some of the features of FIG. 1A, we further discuss the overall concept of the disclosure. The process involves selecting a resource (which can be a node as in node 1 116 of FIG. 1A, or a particular resource such as a processor or disk space etc.) and then traversing all of the fixed time relationship jobs associated with that resource, starting with a first job, and then processing a second job in comparison to the first, and then a third job and so forth until all the jobs have been processed. Then the next resource processes the jobs associated with that resource and then blends the processing of the various resources each having its associated jobs. Then a global analysis is done to blend the job-level and resource-level analyses in order to generate a listing of acceptable resource at which to start jobs and the time frame at which to start those jobs. These nested processing loops enable a user to receive the maximized listing of resources and available times to start. Thus, when the system walks through the analysis for a resource (like a node), the system identifies the bounds, time and quantity of the resource or resources on the node. Then the system walks through again and focuses on the particular range and identifies the details about how the system came up with the details of availability and start times, etc. in the first place. After the analysis, if the system creates a reservation to process the job, the system knows that the reservation will enable the compute environment to adequately process the at least two jobs with their offsets and disparate resource types.

A user interface can include the ability of a user to select from the list of acceptable resources and starting times or the system can automatically pick a particular time such as the first timeframe at which the jobs can process. The global analysis provides a global resource availability range which represents availability of all nodes in the compute environment, such as a cluster, which can co-allocate all the resources associated with the jobs.

In one aspect of the disclosure, the available timeframes shift. When this shift occurs, all of the available time frames 130, 132, 102 are equally shifted in time by the offset. In our example, all of these available timeframes are shifted back in time ½ hour. It does not matter which resource type is shifted and in which direction. In other words, the disk space available timeframes 138, 140 and 136 can be shifted to the right by the offset of ½ hour. The only requirement is that the system track which availability timeframes associated with which resource type are shifted and which are not.

Figure 1B:
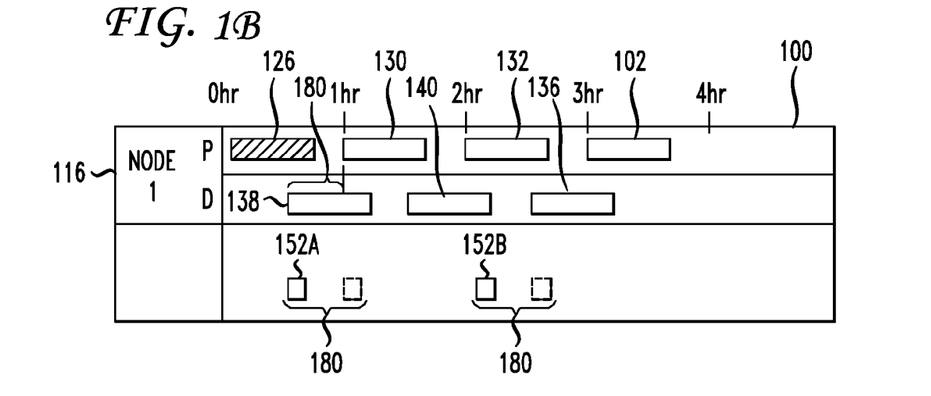
FIG. 1B illustrates further some of the concepts of the present disclosure.

Returning to FIG. 1A and FIG. 1B, the start range 152A, 152B is shifted by a certain amount which is preferably the specified job offset 180. This shifting is illustrated in FIG. 1B. The job offset represents a difference in time between the start of a first job associated with a first resource type and the start of a second job consuming a different resource type but that is connected to the first job. For example, first job can be job 130 that starts at 1 hour and job 138 that starts ½ hour before job 130. In this case, the job offset would be ½ hour. This job offset is an offset between any two job types. Therefore, it is not just between a job associated with disk space and a job associated with consuming processors. It can be an offset between any two associate jobs or resource requests of two resource types. FIG. 1B shows that all of the range list timeframes shift together. This is the preferable way to perform this shift. Each can separately be shifted as well or be shifted in different directions based on various parameters, such as, for example, the particular offset relationship between each range and an associated timeframe from a different resource. The shifted data whether it be from the start range or the available time frames for a particular job are then copied into a node range.

Next, a node range is generated which reflects available resources associated within a node. The copying of the shifted start range (or shifted availability timeframes or other data that can be shifted) into the node range is performed to a first job. For all subsequent jobs, the system logically AND's the respective jobs' start ranges with the node ranges. The start range in this case reflects, in one aspect of the disclosure, the start range for the respective subsequent job that is being processed. This can reflect the start range generated for each subsequent job which is AND'ed together with the one node range or it can relate to different start ranges and different node ranges. Thus, in one aspect of the disclosure, the node range begins with being the start range copied from the first job. Then, each of the subsequence jobs, the start range for that particular job is AND'd with the node range and the node range thus becomes more constricted. Once all the jobs have been processed, the node range represents the range of available time where all resources are available within a given node.

The system continues to process jobs within a node (or a resource) and then move to a next node (resource) in a compute environment. In this regard there are several nested loops of processing a node or a particular resource, and jobs or resource requests therein, and then move on to the next node or resource. Once all of the jobs associated with a resource or a node, such as all jobs on node 1 116, and in one aspect of the disclosure after all nodes have been processed according to the steps above, the system logically OR's the node range with a global range. The global range reflects the timeframes and resource quantities available to the overall grouping of jobs where all jobs can simultaneously consume their requested resources at the specified offsets on the same set of allocated resources. Thus, the global range can be looking at timeframes and resources available on a cluster, grid or other grouping of compute resources. From this OR'ing of the node range with a global range, the system can generate a list of acceptable resources on which to start jobs and the timeframe at which to start. Once that list is generated, the workload manager or other management software generates a reservation for resources according to the list of acceptable resources and associated job offsets.

Figure 1C:
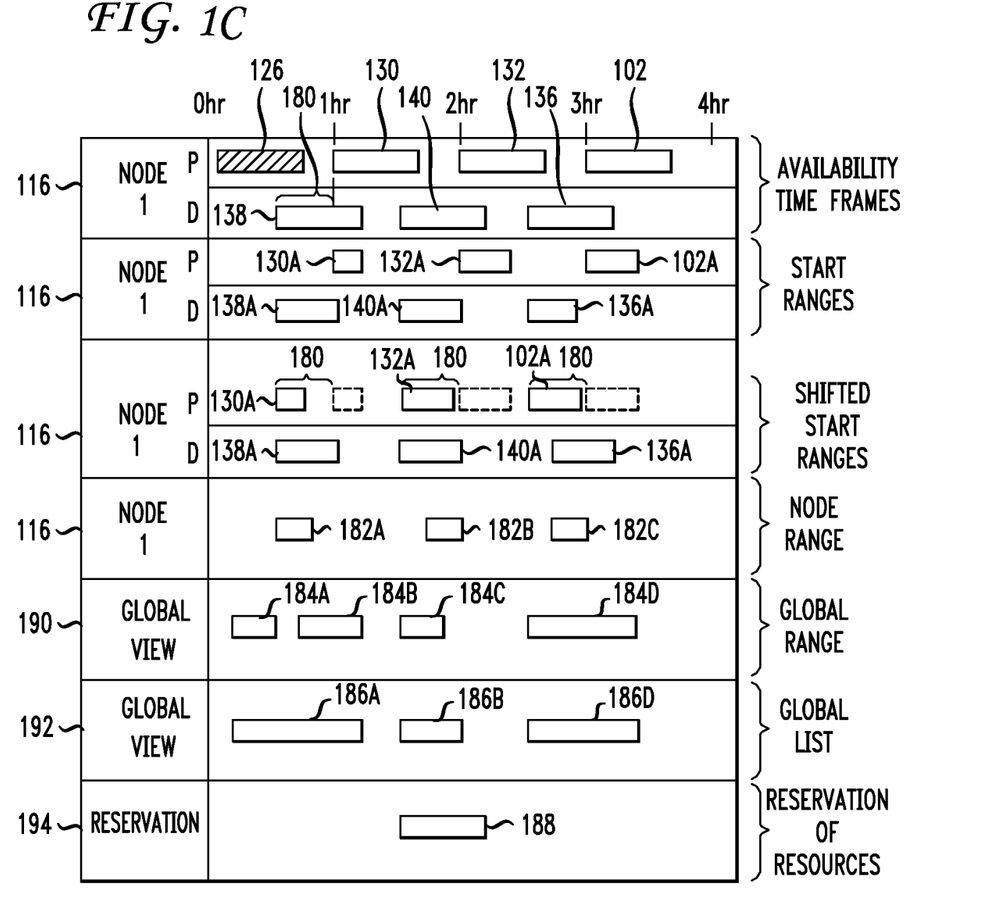
FIG. 1C illustrates further some of the concepts of the present disclosure.

FIG. 1C illustrates in another way the process of an aspect of the disclosure. As with FIGS. 1A and 1B, this shows two resources (processor and disk space) of the many resources that can be associated with a node 116 in a compute environment. The first row shows the availability timeframes for two jobs for resources on node 1. The features shown correspond to those of FIG. 1A. The next row shows start ranges for each availability time frame. For example, start ranges 130A, 132A and 102A correspond respectively to the availability time frames 130, 132 and 102 and represent the start range for each of the time frames. As mentioned above, the start range represents, in one aspect, a possible time frame at which the job could start. Thus, the start range is more restrictive than the availability range. The start ranges for the disk resource are shown as 138A, 140A and 136A.

The next row illustrates the shifting of the start ranges in time by, for example, the offset 180. Thus, start ranges 120A, 132A and 102A are all shifted to the left in time by the offset 180. Any time period can be chosen, and the other resource start ranges 138A, 140A and 136A could also be shifted by a time, such as time 180, to the right to match up. Whichever group of start ranges is shifted can be shifted together as a unit as shown.

The next row illustrates a node range 182A, 182B, 182C. This represents the range of available time all resources contained within a given node are available. This can be generated in several different ways such as through logical AND or OR operations associated with the various start ranges. For example, shown in the Node Range row of FIG. 1C is the logical AND'ing of the shifted start ranges for the resource of processor and the start ranges for the disk storage. There can be other ways to generate the node range. As can be appreciated, the node range represents a more constraining listing of times than the start ranges.

The next row 190 of FIG. 1C represents a global range 184A, 184B, 184C and 184D shows show the timeframes and resource quantities available to the overall grouping of jobs. Row 192 shows a global list 186A, 186B and 186C which show a list of acceptable resources on which to start jobs and the timeframe at which to start. This can be generated in several different ways. Shown in FIG. 1C is a logical OR'ing of a node range and the global range. Finally, row 194 shows a reservation 188 of resources. As mentioned herein, a user can select this reservation or it can be automatically generated according to a set of parameters. The reservation 188 reflects the generation of a reservation associated with the global listing 186B of available resources. With the reservation 188, the job that needs to be submitted to consume resources will be established with its necessary offset between disparate resources and be processed in an efficient manner.

Figure 2:
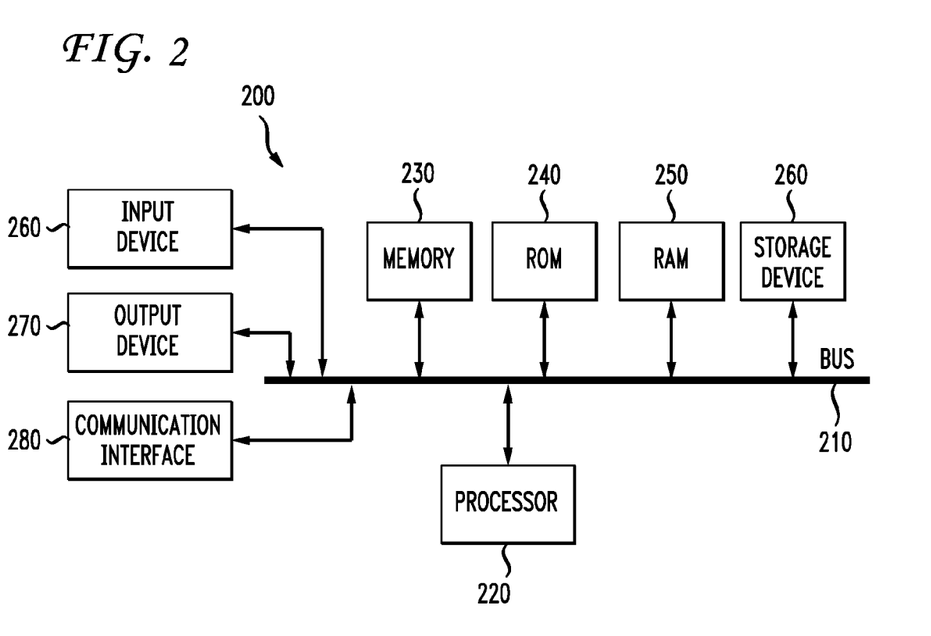
FIG. 2 illustrates the basic hardware components according to an embodiment of the disclosure.

We now turn to a general description of a computing device according to an embodiment of the disclosure. With reference to FIG. 2, an exemplary system for implementing the principles herein include a general purpose computing device 200, including a processing unit (CPU) 220, a system memory 230, and a system bus 210 that couples various system components including the system memory 230 to the processing unit 220. The system bus 210 can be any of several types of bus structures including a memory bus or memory controller, a peripheral bus, and a local bus using any of a variety of bus architectures. The system can also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer-readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that is accessible by a computer, such as magnetic cassettes, flash memory cards, digital video disks, Bernoulli® cartridges, random access memories (RAMs) read only memory (ROM), and the like, can also be used in the exemplary operating environment. The system above provides an example server or computing device that can be utilized and networked with a cluster, clusters or a grid to manage the resources according to the principles set forth herein. In this case, the system aspect of the disclosure becomes the computing environment having multiple processors and nodes as is the case in a cluster or a grid. It is also recognized that other hardware configurations can be developed in the future upon which the method can be operable.

Figure 3:
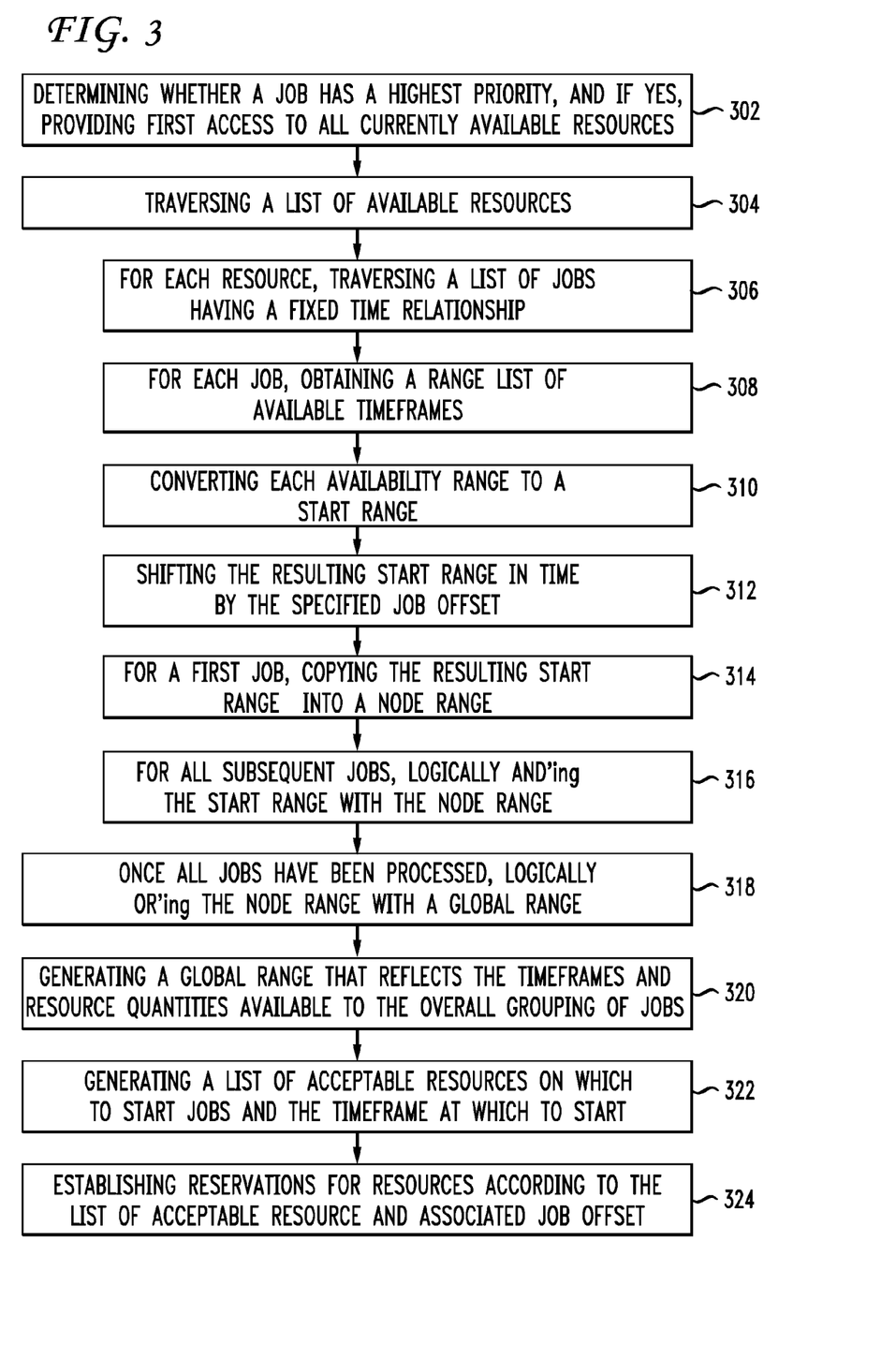
FIG. 3 illustrates a method embodiment of the disclosure.

FIG. 3 illustrates the method embodiment of the disclosure. The method relates to scheduling multiple jobs with a fixed relationship in both time and space. A method consisting of two or more jobs where each job has its own duration, resource requirements, allocated resources and actions. Other parameters can also be associated with each job. The method establishes a fixed time relationship between the jobs which allows specification and enforcement of a fixed time offset relationship between each of the jobs resulting in a job overlap, juxtaposition or an offset-based relationship. Further, the method includes the forced relationship in space so that all jobs allocate the same resource objects while dedicating subsets of the resource's consumable resources to themselves.

As shown in FIG. 3, the method comprises determining whether a job has a highest priority, and if yes, providing first access to all currently available resources (302), traversing a list of available resources (304), for each resource, traversing a list of fixed time relationship jobs (306). In this case, each resource can refer to a particular resource such as processor or disk space or can refer to a node such as node 1, 2 or 3 in FIG. 1A. The method further comprises obtaining a range list of available timeframes for each job (308), converting each availability range to a start range (310), shifting the resulting start range (or other data) in time by the specified amount of time such as by the job offset (312), for a first job, copying the resulting start range into a node range (314), for all subsequent jobs, logically AND'ing the start range with the node range (316), once all jobs have been processed, logically OR'ing the node range with a global range (318), and once all nodes have been processed, the resulting global range reflects the timeframes and resource quantities available to the overall grouping of jobs where all jobs can simultaneously consume their requested resources at the specified offsets on the same set of allocated resources (320). Based on the information, the method comprises generating a list of acceptable resources on which to start and the timeframe at which to start (322) and resource reservations can then be created (324).

In one aspect of the disclosure, the nested loops in the flowchart of FIG. 3 are that steps 306-318 are processed on the resource or node level, and steps 308-316 are nested within the node and relate to processing each job within the resource or node. Then starting at step 320 the method turns to a global view to further analyze the overall grouping of jobs and other resources available from which the method involves generating the list of available resources on which to start jobs and the timeframes at which to start.

A user interface is also involved in which an administrator or a user who submits jobs or some other user can graphically view the analysis. Therefore, there are various steps involved in the interaction with a user, such as presenting the generated list of acceptable resources on which to start jobs and available timeframes at which to start. There can be options such as an opportunity to pay an additional amount of money for an earlier time frame that is available but perhaps is outside of the scope of a particular usage package that the user or group has. For example, if a particular group has paid for a service that guarantees processing time within 3 hours of a request, and an available time based on the analysis above includes a time frame in 1 hour, that the user can opt to pay an additional amount (or be given the opportunity for free) to go ahead and select that start time of 1 hour. As another example of the user interaction, the user can be presented with available time frames from starting in 1 hour, 3.5 hours and 10 hours. The user can then select and submit a request (say 10 hours) and the system will then establish the reservation for the resources according to the request. The system can alternately have an automatic approach where the user has a profile in which the earliest time is always selected, or the cheapest time, or the time that insures the job to be processed before 9:00 AM the next day, and so forth.

Embodiments within the scope of the present disclosure can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description can contain specific details, they should not be construed as limiting the claims in any way. Other configurations of the described embodiments of the disclosure are part of the scope of this disclosure. For example, each of the processing steps above can involve various logical operations, such as AND'ing or OR'ing timeframes or other data together, or performing some other operation to move to the next step. Accordingly, the appended claims and their legal equivalents should only define the disclosure, rather than any specific examples given.

I claim:

1. A method comprising:
generating which is to consume compute resources in a compute environment a first start range of each instance of a workload in a list of workloads;
determining a second start range using a node range that indicates available compute resources of a node in the compute environment;
logically AND'ing the second start range with the node range to yield a second node range;
logically OR'ing the second node range with a global node range to yield a third node range, wherein the global node range reflects timeframes and compute resources available to all instances of the workloads that can simultaneously consume compute resources on a same set of allocated compute resources;
generating a list of compute resources using the third node range on which to start instances of the workload from the list of workloads to consume compute resources and a timeframe at which to start the jobs; and
establishing a reservation in the compute environment using the list of compute resources.

2. The method of claim 1, wherein the list of workloads has a fixed time relationship between at least two instances of a workload in the list of workloads, wherein at least one of the steps of claim 1 are performed for each instance of a workload in the list of workloads.

3. The method of claim 1, further comprising shifting the first start range in time by an offset to yield a shifted first start range.

4. The method of claim 3, wherein the offset is used to establish the reservation.

5. The method of claim 1, wherein parameters of each instance of a workload which are used to identify a history of available timeframes comprise at least one of duration, resource requirements, allocated resources and actions.

6. The method of claim 2, wherein the fixed time relationship between each of the at least two instances of a workload is established by specifying and enforcing an offset-based relationship between the at least two instances of a workload.

7. The method of claim 2, further comprising determining whether an instance of a workload of the least two instances of a workload has a highest priority, and if yes, providing first access to all currently available compute resources to the instances of a workload with the highest priority.

8. The method of claim 2, wherein the fixed time relationship between each of the at least two instances of a workload results in at least one of workload overlap, workload juxtaposition and an offset-based relationship between instances of a workload.

9. A non-transitory computer-readable medium storing instructions which, when executed by a processor, cause the processor to perform operations comprising:
   generating which is to consume compute resources in a compute environment a first start range of each instance of a workload in a list of workloads;
   determining a second start range using a node range that indicates available compute resources of a node in the compute environment;
   logically AND'ing the second start range with the node range to yield a second node range;
   logically OR'ing the second node range with a global node range to yield a third node range, wherein the global node range reflects timeframes and compute resources available to all instances of the workloads that can simultaneously consume compute resources on a same set of allocated compute resources;
   generating a list of compute resources using the third node range on which to start instances of the workload from the list of workloads to consume compute resources and a timeframe at which to start the jobs; and
   establishing a reservation in the compute environment using the list of compute resources.

10. The non-transitory computer-readable medium of claim 9, wherein the list of workloads has a fixed time relationship between at least two instances of a workload in the list of workloads, wherein at least one of the steps of claim 1 are performed for each instance of a workload in the list of workloads.

11. The non-transitory computer-readable medium of claim 9, wherein the computer-readable medium stores instructions which cause the operations to further comprise shifting the first start range in time by an offset to yield a shifted first start range.

12. The non-transitory computer-readable medium of claim 9, wherein the computer-readable medium stores instructions which cause the operations to further comprise the offset to be established using the reservation.

13. The non-transitory computer-readable medium of claim 9, wherein parameters of each workload which are used to identify a history of available timeframes comprise at least one of duration, resource requirements, allocated resources and actions.

14. The non-transitory computer-readable medium of claim 9, wherein the fixed time relationship between each of the at least two instances of a workload is established by specifying and enforcing an offset-based relationship between the at least two instances of a workload.

15. The non-transitory computer-readable medium of claim 9, wherein the computer-readable medium stores instructions which cause the operations to further comprise determining whether an instance of a workload of the least two instances of a workload has a highest priority, and if yes, providing first access to all currently available compute resources to the instance of a workload with the highest priority.

16. The non-transitory computer-readable medium of claim 9, wherein the fixed time relationship between each of the at least two instances of a workload results in at least one of workload overlap, workload juxtaposition and an offset-based relationship between instances of a workload.

17. A system comprising:
   a processor; and
   a computer-readable storage medium storing instructions, which, when executed by the processor, cause the processor to perform operations comprising:
   generating which is to consume compute resources in a compute environment a first start range of each instance of a workload in a list of workloads;
   determining a second start range using a node range that indicates available compute resources of a node in the compute environment;
   logically AND'ing the second start range with the node range to yield a second node range;
   logically OR'ing the second node range with a global node range to yield a third node range, wherein the global node range reflects timeframes and compute resources available to all instances of the workloads that can simultaneously consume compute resources on a same set of allocated compute resources;
   generating a list of compute resources using the third node range on which to start instances of the workload from the list of workloads to consume compute resources and a timeframe at which to start the jobs; and
   establishing a reservation in the compute environment using the list of compute resources.

18. The system of claim 17, wherein the list of workloads has a fixed time relationship between at least two instances of a workload in the list of workloads, wherein at least one of the steps of claim 1 are performed for each instance of a workload in the list of workloads.

19. The system of claim 18, when the computer-readable medium stores further instructions which cause the processor to perform further operations comprising shifting the first start range in time by an offset to yield a shifted first start range.

20. The system of claim 17, wherein the offset is established using the reservation.

* * * * *